J. W. Dixon
Paper Making Process.
Nº 51,706. Patented Dec. 26, 1865.
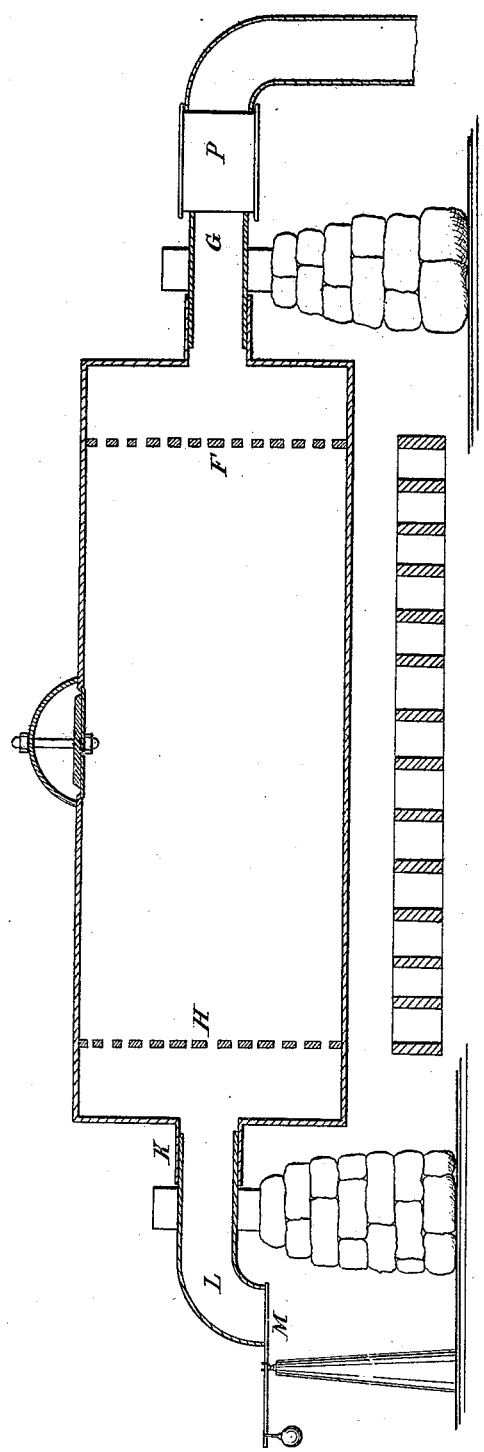
Witnesses.
John Welsh
James Doeff
Inventor.
John. W. Dixon

UNITED STATES PATENT OFFICE.

JOHN W. DIXON, OF PHILADELPHIA, PENNSYLVANIA.

IMPROVED PROCESS FOR TREATING VEGETABLE FIBER FOR THE MANUFACTURE OF PAPER-PULP.

Specification forming part of Letters Patent No. 51,706, dated December 26, 1865.

*To all whom it may concern:*

Be it known that I, JOHN W. DIXON, of the city of Philadelphia and State of Pennsylvania, have invented a new and useful Process of Treating Wood and Vegetable Fibrous Matter for Making Paper-Pulp; and I hereby declare the following to be a full and exact description of the same, reference being had to the annexed drawing, making a part of the same, which represents an apparatus for carrying out my invention.

My improvement consists in subjecting wood or woody matter, straw, or analogous vegetable matter, when cut into small pieces, to the dissolving action of highly heated water in a liquid state in a revolving digester.

Heretofore, straw and other substances have been submitted to the action of a solution of caustic soda in a closed revolving boiler at a pressure at or about seventy pounds to the square inch.

My improvement consists in subjecting wood and woody matters to the chemical action of highly-heated water under pressure in the liquid state. When said matter is so treated in a revolving digester, and in conjunction with said revolving digester, I cause a supply of fresh water to be injected and a portion of the refuse water to escape, either continually or at intervals, while the temperature of the water within the digester is maintained.

Figure 1 represents a vertical longitudinal section of a revolving digester suitable for applying my process. It is made to revolve on hollow trunnions. The woody or other vegetable fibrous material to be pulped is introduced through the man-hole D, which is then securely closed. The water is introduced through the trunnion G by means of a pump or injector. F is a perforated diaphragm to separate the material from the entering water. H is a perforated diaphragm through which the escaping refuse water strains off and passes out through the hollow trunnion K. The interior of the trunnion K connects with a tube, L, having a balanced valve, M, adjusted so as to open only when fresh water is forced in through the hollow trunnion G.

Heat may be applied to the contents of the revolving digester, either by a coil of pipe through which the water forced in at G is made to pass or by fire heat applied under the revolving digester.

In digesting wood I prefer a heat due to the pressure of one hundred and fifty to two hundred pounds to the square inch, although at a pressure of one hundred and twenty-five pounds to the square inch the operation will progress very slowly. With straw and analogous vegetable fibrous matter a less heat and pressure than that due to one hundred and fifty pounds will answer.

The operation is as follows: The woody or other fibrous vegetable matter, having been cut into small pieces, is introduced into the man-hole, and this being closed water is introduced through the trunnion G. Heat being then applied until a pressure of about one hundred and fifty to two hundred pounds is attained within the digester. The vessel is to be slowly revolved on its trunnions. After a time the pump P or injector is to be started, so as to force in fresh water (either at intervals or continuously) through trunnion G. The safety or balance valve at M is to be so adjusted as to open whenever fresh water is forced in at G and to admit a corresponding quantity of refuse matter to escape.

The operation of the revolving digester would be increased by placing pockets or ledges in the circumference of the revolving boiler, or of stationary radial arms or vanes extending from the trunnion into the boiler.

Having thus described my improved process, what I claim as my invention, and desire to secure by Letters Patent, is—

1. Subjecting wood, woody matter, straw, or other analogous vegetable fibrous material to the chemical action of highly-heated water under pressure in a liquid state in a revolving digester, substantially as above described.

2. In combination, with subjecting wood, woody matter, straw, and other analogous vegetable fibrous material to the chemical action of highly-heated water under pressure in a liquid state while revolved in a digester, the forcing into the woody matter within said revolving boiler, either continuously or at intervals, fresh water to replace an equal quantity of refuse water forced out or escaping therefrom, substantially as above described.

JOHN W. DIXON.

Witnesses:
JOHN WELCH,
JAMES DUFF.